United States Patent
Tamari et al.

(10) Patent No.: US 8,288,705 B2
(45) Date of Patent: Oct. 16, 2012

(54) POSITION ADJUSTMENT DEVICE FOR REFLECTOR, DETECTION METHOD AND DETECTION DEVICE

(75) Inventors: Hideki Tamari, Nagoya (JP); Takashi Hida, Mie-ken (JP); Kenshin Yokose, Kariya (JP)

(73) Assignee: Denso Corporation, Kariya (JP)

( * ) Notice: Subject to any disclaimer, the term of this patent is extended or adjusted under 35 U.S.C. 154(b) by 405 days.

(21) Appl. No.: 12/455,875

(22) Filed: Jun. 9, 2009

(65) Prior Publication Data

US 2009/0302196 A1 Dec. 10, 2009

(30) Foreign Application Priority Data

Jun. 10, 2008 (JP) ................. 2008-152138

(51) Int. Cl.
*G06M 7/00* (2006.01)
(52) U.S. Cl. ...................................................... 250/221
(58) Field of Classification Search .................. 250/221; 342/54, 70–72, 74, 174; 359/443; 356/138, 356/139.03–139.08, 139.1–148, 152.1–152.3, 356/154
See application file for complete search history.

(56) References Cited

U.S. PATENT DOCUMENTS

| 4,566,202 A * | 1/1986 | Hamar ............................. 33/286 |
| 6,020,844 A * | 2/2000 | Bai et al. ........................ 342/165 |
| 2007/0144540 A1 * | 6/2007 | Henrich ........................ 128/898 |

FOREIGN PATENT DOCUMENTS

| JP | 2-59474 | 5/1990 |
| JP | 2007-033254 | 2/2007 |

OTHER PUBLICATIONS

English machine translation of JP 2007033254 A, translated Aug. 9, 2011.*

* cited by examiner

*Primary Examiner* — Georgia Y Epps
*Assistant Examiner* — Renee Naphas
(74) *Attorney, Agent, or Firm* — Harness, Dickey & Pierce, PLC

(57) ABSTRACT laser light is beamed substantially perpendicular to a screen member, while temporarily fixing the laser transmitter at three of more points at regular intervals in a rotary direction about the rotary axis TA. The rotary axis TA is defined by a straight line that passes through the light emitting opening of the laser transmitter and is substantially perpendicular to the screen member. The beamed direction of the laser light beamed from a laser transmitter is adjusted by a transmitter position adjustment portion so as to make the laser light hit the center of the three or more points on the screen member.

10 Claims, 9 Drawing Sheets

POSITION ADJUSTMENT DEVICE FOR REFLECTOR, DETECTION METHOD AND DETECTION DEVICE

CROSS REFERENCES TO RELATED APPLICATION

The present application relates to and incorporates by reference Japanese Patent application No. 2008-152138 filed on Jun. 10, 2008.

BACKGROUND OF THE INVENTION

1. Field of the Invention

The present invention relates to a position adjustment device for a reflector used for detecting radar devices. The present invention also relates to a detection method and a detection device for detecting radar devices using the reflector whose position has been adjusted by the position adjustment device.

2. Description of the Related Art

Japanese Unexamined Patent Publication No. 2007-33254 discloses a radio darkroom as a device for precisely adjusting a position of an object to be measured and a measurement means.

The wave darkroom disclosed in the above Patent Publication comprises a turntable on which an antenna to be measured is placed, and also comprises a measurement antenna that is placed at a distance from and faces the antenna to be measured. It further comprises a light beam device that beams laser light passing through the center of the turntable to place the antenna at a determined position. The determined position of the antenna is given by the light spot of the laser light beamed from the light beam device.

Meanwhile, detection of radar devices mounted to automobiles requires such an arrangement that a radar device and a reflector used for reflecting radio waves beamed from the radar device are to be placed, for example, in a wave dark box in a face to face manner. In this detection step, the radar device is fixed to a mounting table so as to face the reflector. Generally, the detection of radar devices is performed in such a manner that one radar device fixed to the mounting table subjected to the detection is thereafter replaced by a subsequent radar device to be detected. Therefore, the mounting table and the reflector have to be positioned to permit the radar device to be fixed to the mounting table so as to accurately face the reflector.

A positioning of the mounting table and the reflector can be performed using the light beam device (laser pointer) that is adapted to beam the laser light as introduced, for example, in the above Patent Publication. However, in this positioning method, accuracy of the positions of the mounting table and the reflector determined by the laser pointer depends on the degree of accuracy of the laser pointer (±0.1 degrees). Thus, highly accurate positioning and, hence, detection exceeding ±0.1 degrees could be impossible.

SUMMARY OF THE INVENTION

The present invention has been made in such view, and it is therefore an object of the present invention to provide a position adjustment device capable of further highly precisely adjusting a position of a reflector, and to provide a detection method and a detection device.

A position adjustment device for reflector designed to pursue the above object is used for adjusting a position of a reflector. The reflector is placed so as to face a radar device that is fixed to a fixing table, and reflects radio waves beamed from the radar device. The detection device comprises a screen member having a surface that is substantially perpendicular to a ground surface. The detection device also comprises a light emitting portion that is disposed to face the screen member and beams laser light in a direction substantially perpendicular to the screen member.

The position adjustment device for reflector also comprises a fixing member for temporarily fixing the light emitting portion at regular intervals at three or more points along a rotational direction. The light emitting portion rotates about a rotary axis that is defined by a straight line passing through a light emitting opening of the light emitting portion that beams the laser light.

The position adjustment device for reflector further comprises a position adjustment means for light emitting portion used for adjusting a direction of the laser light beamed from the light emitting portion to make the laser light hit the center of spots defined around the circumference of the laser light. The spots are marked at three or more points on the screen member by the laser light beamed from the light emitting portion.

Temporarily fixing the light emitting portion at the three or more points at regular intervals about the rotary axis causes the beamed spots (three or more points) to be located on a circle circumference. The circle circumference is drawn about such a center point on the screen member that the laser light beamed from the light emitting portion onto the screen member at a precisely determined position. The rotary axis is defined by the straight line that passes through the light emitting opening and is substantially perpendicular to the screen member having a surface that is substantially perpendicular to the ground surface. That is, the three or more points are determined to be located on the circle circumference drawn about the beamed point of the laser light that is perpendicularly beamed to a reference plane. The reference plane is perpendicular to the ground surface on which the position adjustment device is placed.

Accordingly, adjusting the direction of the laser light beamed from the light emitting portion so as to make the laser light hit the center of the beamed spots (three or more points) on the screen member can correct variation of the light emitting portion. The laser light is to be used as a base to adjust the position of a reflector. The position adjustment of the reflector using the position adjustment device including the light emitting portion precisely positioned permits further highly precise positioning of the reflector.

A detection method for detecting radar device according to the present invention to achieve the above object is performed after the reflector's position has been adjusted.

The detection method uses the reflector that reflects radio waves beamed from a radar device fixed to a fixing table. The radar device is adapted to receive the radio waves reflected from the reflector to detect the radar device.

The detection method comprises a step of beaming laser light substantially perpendicular to a screen member. The laser light is beamed from a light emitting portion of a position adjustment device used for adjusting a position of the reflector. The screen member is placed substantially perpendicular to the ground surface.

The step of beaming laser light comprises a rotary beam step for beaming laser light from a light emitting portion while temporarily fixing the light emitting portion at regular intervals at three or more points along a rotational direction. The light emitting portion rotates about a rotary axis. The rotary axis is defined by a straight line passing through a light emitting opening of the light emitting portion that emits the laser light.

The step of beaming laser light also comprises a light-emitting-portion adjustment step for adjusting a direction of the laser light beamed from the light emitting portion to make the laser light hit the center of spots. The spots are defined at three or more points on the screen member by the laser light beamed from the light emitting portion.

The step of beaming laser light further comprises a reflector adjustment step for adjusting a position of the reflector based on the laser light beamed from the light emitting portion of the position adjustment device fixed to the fixing table. The reflector is positioned to face the position adjustment device. The position of the position adjustment device has been adjusted in the preceding light-emitting-portion adjustment step.

Temporarily fixing the light emitting portion at the three or more points at regular intervals about the rotary axis allows the beamed points (three or more points) to be located on a circle circumference drawn about such a center point on the screen member that is the spotted point of the laser light beamed from the light emitting portion precisely positioned. The rotary axis is defined by the straight line that passes through the light emitting opening and is substantially perpendicular to the screen member having a surface that is substantially perpendicular to the ground surface.

That is, the three or more points are determined to be located on the circle circumference drawn about the projected point of the laser light. The laser light perpendicularly beamed to a reference plane. The reference plane is perpendicular to the ground surface on which the position adjustment device is placed.

Accordingly, adjusting the direction of the laser light beamed from the light emitting portion so as to make the laser light hit the center of the beamed spots (three or more points) on the screen member can correct a variation of the light emitting portion. The laser light is to be used as a base to adjust the position of a reflector. Placing the adjusted position adjustment device to the fixing table to face the reflector, and adjusting the reflector's position based on the laser light beamed from the light emitting portion permits further highly precise positioning of the reflector.

When the reflector's position is adjusted using the position adjustment device, the detection method can further include a mirror mounting step in which a mirror is mounted to the center of the reflector. The mirror mounting step is performed in the reflector adjustment step, wherein the laser light is beamed to the reflector provided with the mirror. The reflector is adjusted to a desired position where the laser light reflected from the mirror hits a predetermined area.

Merely making the laser light reflected from the mirror hit the predetermined area allows a simple positioning of the reflector.

When the mirror used has a dimension varying from the diameter of the beamed spot of the laser light, such a variation adversely presents deviation in the positioning. Therefore, in the reflector adjustment step, the mirror having a dimension similar to a diameter of the beamed spot of the laser light is required, because such an arrangement results in little variation in the positioning.

The radar device fixed on the fixing table and the reflector can be designed to be placed in a wave dark box that has side wall faces covered with a wave absorber, so that an automatic transportation step can be provided to automatically convey the radar device fixed to the fixing table into the wave dark box.

This automated step can preferably improve the number of man-hours for positioning.

Further, an automatic power connection step can be included to automatically connect and disconnect a power connecter to/from the radar device fixed to the fixing table.

This automated step can also preferably provide the improved man-hours.

A detection device for detecting radar device according to the present invention to achieve the above object is used after the reflector's position has been adjusted. The detection device uses a radar device fixed to a fixing table and the reflector that reflects radio waves beamed from the radar device, and the radar device is adapted to receive the radio waves reflected from the reflector.

The detection device comprises a screen member having a surface that is substantially perpendicular to a ground surface. The detection device also comprises a light emitting portion that is disposed to face the screen member and beams laser light in a direction substantially perpendicular to the screen member.

The detection device also comprises a fixing member for temporally fixing the light emitting portion at regular intervals at three or more points along a rotational direction. The light emitting portion rotates about a rotary axis that is defined by a straight line passing through a light emitting opening of the light emitting portion that beams the laser light.

The detection device further comprises a reflector-position adjustment means for adjusting a position of the reflector. The reflector-position adjustment means uses a position adjustment means for light emitting portion for adjusting a direction of the laser light beamed from the light emitting portion to make the laser light hit the center of the positioning spots. The spots are defined at three or more points on the screen member by the laser light beamed from the light emitting portion.

Temporarily fixing the light emitting portion at the three or more points at regular intervals about the rotary axis allows the beamed points (three or more points) to be located on a circle circumference. The circle circumference is drawn about such a center point which is defined precisely by the laser emitted from the light emitting portion precisely positioned. The rotary axis is defined by the straight line that passes through the light emitting opening and is substantially perpendicular to the screen member having a surface that is substantially perpendicular to the ground surface.

That is, the three or more points are determined to be located on the circle circumference drawn about the projected point of the laser light that is perpendicularly beamed to a reference plane. The reference plane is perpendicular to the ground surface on which the position adjustment device is placed.

Accordingly, a variation of the light emitting portion can be corrected by adjusting the direction of the laser light beamed from the light emitting portion so as to make the laser light hit the center of the positioning spots (three or more points) on the screen member. The laser light is to be used as a base to adjust the position of a reflector.

This arrangement allows further highly precise positioning of the reflector, because the reflector's position is adjusted by the position adjustment device whose position has been adjusted in advance. That is, this arrangement provides a centering of the reflector.

The detection device can comprise a mirror at a center of the reflector. The reflector-position adjustment means can be adapted to act so that the reflector is adjusted to a position where the laser light beamed from the light emitting portion and reflected from the mirror hits a predetermined area.

A simple positioning of the reflector can be completed by merely making the laser light reflected from the mirror hit the predetermined area.

However, when the mirror used in this step has a dimension varying from the diameter of the beamed spot of the laser light, the variation adversely causes deviation in the positioning. Therefore, the mirror is required to have a dimension similar to a diameter of the beamed spot of the laser light to present little deviation in the positioning.

Further, the radar device fixed to the fixing table and the reflector can be designed to be placed in a wave dark box that has sidewall faces covered with a wave absorber. Such a design can provide an automatic transportation means to automatically convey the radar device fixed to the fixing table into the wave dark box.

This arrangement can preferably reduce the man-hours required for positioning spots.

Further, an automatic power connection means can be included in the detection device to automatically connect and disconnect a power connecter to/from the radar device fixed to the fixing table.

This means can preferably make the detection device reduce the man-hours required to for positioning spots.

DETAILED DESCRIPTION OF PREFERRED EMBODIMENTS

Figure 1:
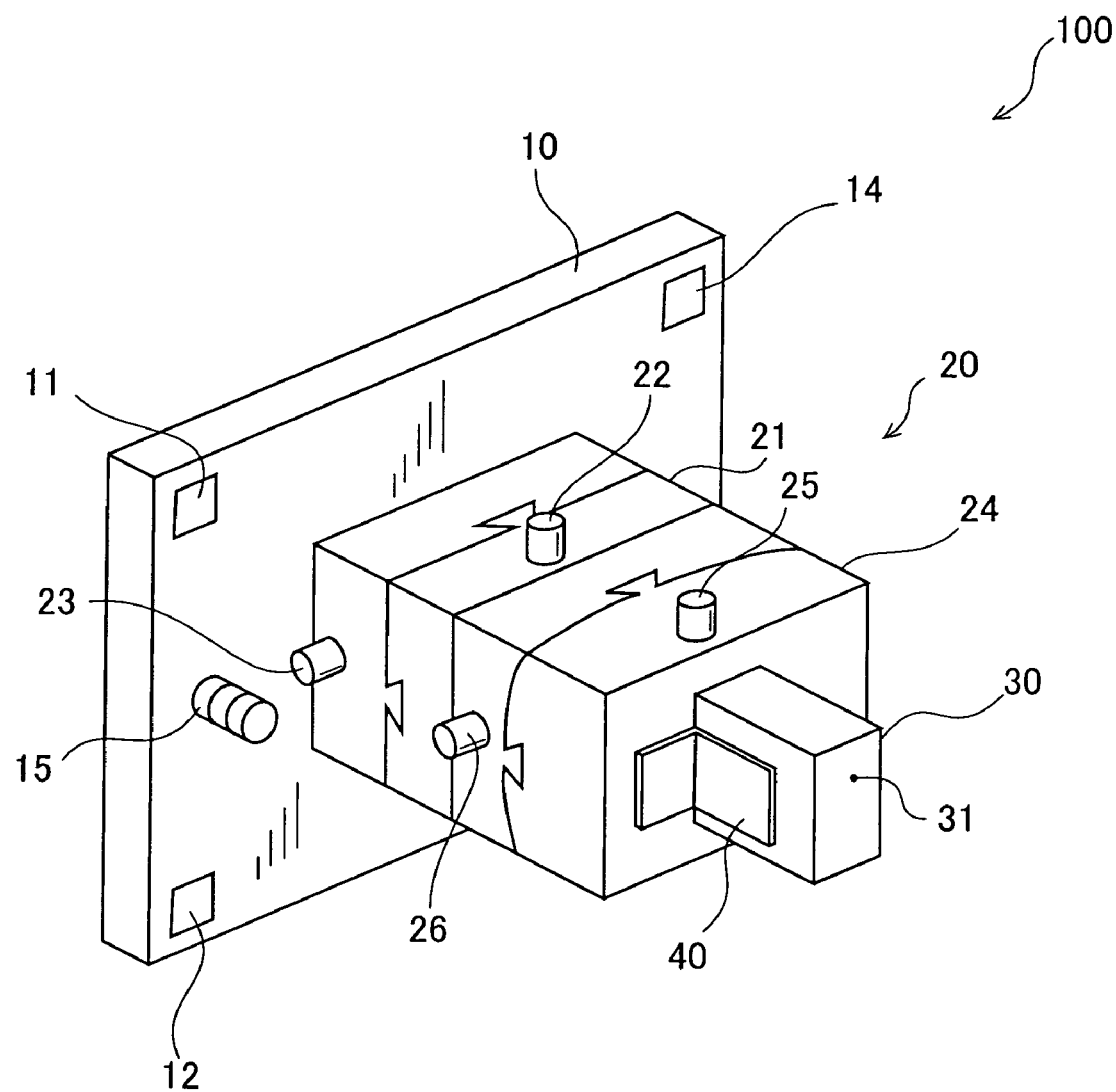
FIG. 1 is a perspective view showing a schematic construction of a position adjustment device according to the preferred embodiment of the present invention.

A detection device according to a preferred embodiment of the present invention will be described referring to the drawings.

The detection device in this embodiment is used in detection of radar devices W (such as millimeter wave radar devices), which are to be mounted to automobiles. As will be described in details later, the detection device uses a reflector 410 that reflects radio waves beamed from a radar device W fixed to a fixing table 700. The radar device W is adapted to receive the radio waves reflected from the reflector 410, which in turns detect the radar device. The detection device in this embodiment uses a position adjustment device 100 to perform a positioning of the reflector 41.

Figure 2:
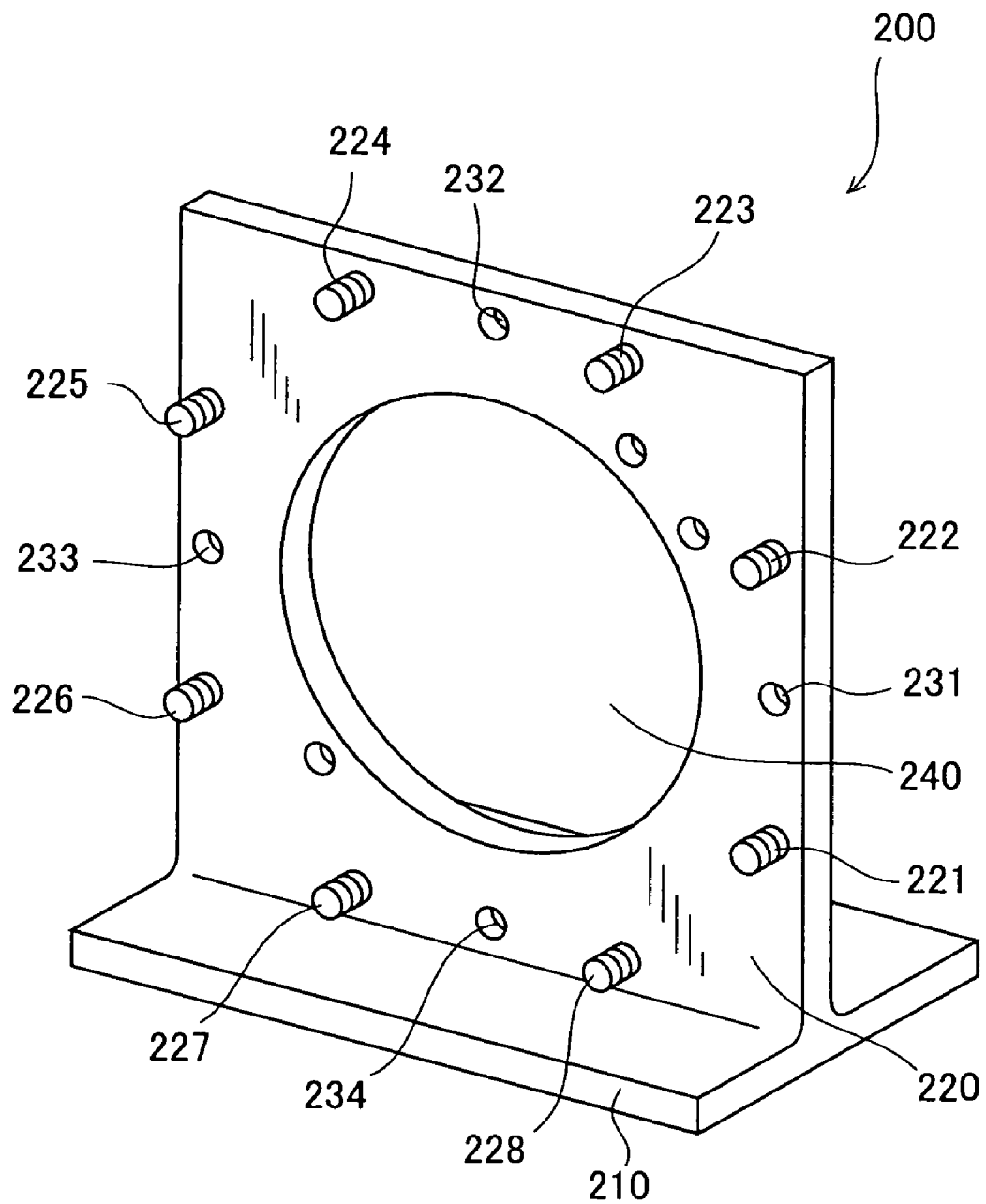
FIG. 2 is a perspective view showing a schematic construction of a correction stay according to the preferred embodiment of the present invention.

First, with reference to FIGS. 1 to 4, the position adjustment device 100 used for adjusting a position of the reflector 410 will be described. FIG. 1 is a perspective view showing a schematic construction of a position adjustment device 100 according to the preferred embodiment of the present invention. FIG. 2 is a perspective view showing a schematic construction of a correction stay according to the preferred embodiment of the present invention. FIGS. 3A, 3B, 3C, 3D and 3E are perspective views showing an adjustment step of laser beam axes beamed from the position adjustment device 100 according to the preferred embodiment of the present invention. FIG. 4 is a perspective view showing a schematic construction of a target member 50 of the position adjustment device according to the preferred embodiment of the present invention.

The position adjustment device 100 is adapted to beam laser light that is used as a base for adjusting (making alignment of) a position of the reflector 410. The position adjustment device 100 includes a laser transmitter 30 and is adjusted (corrected) to be positioned so that laser light beamed from the laser transmitter 30 perpendicularly hits a reference face (which is perpendicular to a ground surface on which the position adjustment device 100 is placed). The reflector 410, which will be described in details later, is used in detecting radar devices W. The reflector 410 is positioned to face the radar device W that is fixed to a fixing table, and reflects radio waves beamed from the radar device W.

As shown in FIG. 1, the position adjustment device 100 consists of a substantially flat mounting plate 10 to which a transmitter-position adjustment member (light-emitting-position adjustment means) 20 is perpendicularly provided. The member 20 is attached to a center portion of one side face (which is a reference face perpendicular to the ground surface) of the mounting plate 10. A laser transmitter (light emitting portion) 30 is fixed to a distal end face (the other face with respect to the connecting face to which the mounting plate 10 is attached) of the transmitter-position-adjustment member 20 with a transmitter fixing member 40.

The mounting plate 10 comprises fixing holes 11, 12, 13, 14 and a positioning bolt 15. The fixing holes 11, 12, 13, 14 are used for temporarily fixing the laser transmitter (light transmitting portion) 30 at three or more points (four points in this embodiment) at regular intervals along one rotary direction. The positioning bolt 15 is used as a base for determining the regular intervals. The laser transmitter 30 rotates about a rotary axis TA that is defined by a straight line passing through a light emitting opening 31 of the laser transmitter 30 and running substantially perpendicular to a screen member 300. The screen member 300 has a face that is substantially perpendicular to the surface ground.

As shown in FIG. 2, the correction stay 200 to which the mounting plate 10 is mounted comprises a board 210, a fixing portion 220 that is standing upright from the board 210, and a adjusting-member-insertion hole 240. The hole 240 allows the transmitter-position-adjusting member 20 and the laser transmitter 30 of the position adjustment device 100 fixed to the fixing portion 220 to pass therethrough. The fixing portion 220 of the correction stay 200 is provided with fixing projections 221, 222, 223, 224, 225, 226, 227 and 228, which correspond to the fixing holes 11, 12, 13 and 14. The fixing portion 220 is also provided with position reference holes 231, 232, 233 and 234, which correspond to the position reference bolt 15. The position reference holes 231-234 are disposed at 90-degree intervals with respect to the center of the adjusting-member-insertion hole 240. That is, the position reference hole 231 is disposed at a three o'clock direction, the position reference hole 232 at a twelve o'clock direction, the position reference hole 233 at a six o'clock direction, and the position reference hole 234 is disposed at a nine o'clock direction.

The transmitter-position-adjusting member 20 comprises a X-Y stage 21 that is used for adjusting the position of the laser transmitter 30 (beamed direction of laser light) in the left-and-right and up-and-down directions (XY directions), and an angle adjusting stage 24 for adjusting the laser transmitter 30 in the angle direction. The X-Y stage 21 is provided with adjusting knobs 22, 23 that is adapted to move the laser transmitter 30 in the left-and-right and up-and-down directions. The angle adjusting stage 24 is provided with adjusting knobs 25, 26 that are used for moving the laser transmitter 30 in the angle direction.

The laser transmitter 30 includes semiconductor laser chips and the like, and beams laser light from the light emitting opening 31. The laser light beamed from the laser transmitter 30 can vary in its beamed direction. That is, the laser light beamed from the laser transmitter 30 sometimes does not move straight forward (to a reference surface perpendicular to the ground surface on which the position adjustment device 100 is placed).

The position adjustment (correction) of the laser transmitter 30 included in the position adjustment device 100 according to the preferred embodiment will be described. First, the position adjustment device 100 and a screen member 300 are positioned face-to-face. The screen member 300 has a face that is perpendicular to the ground surface.

Then, a beaming operation of the laser light beamed from the laser transmitter 30 is carried out, while temporaly fixing the laser transmitter 30 at 90-degree intervals in a rotary direction about the rotary axis TA. The rotary axis TA is defined by a straight line that passes through the light emitting opening 31 of the laser transmitter 30 and that is substantially perpendicular to the screen member 300.

In this operation, four spots are defined by the laser on the screen member 300. Then, an adjustment of the position of the laser transmitter 30 (the beamed direction of the laser light) is performed so that the laser light beamed from the laser transmitter 30 hits the center of the four marks. This adjustment is carried out by the X-Y stage 21 and/or the angle adjusting stage 24.

Figure 3A:
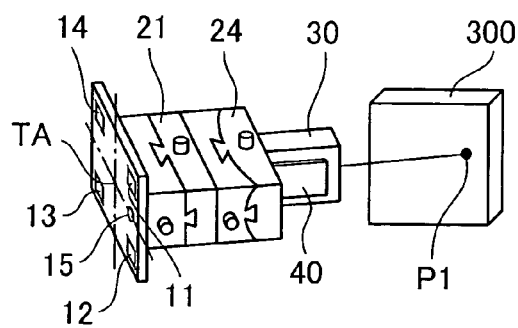
FIGS. 3A, 3B, 3C, 3D and 3E are perspective views showing an adjustment step of laser directions beamed from the position adjustment device according to the preferred embodiment of the present invention.
Figure 4:
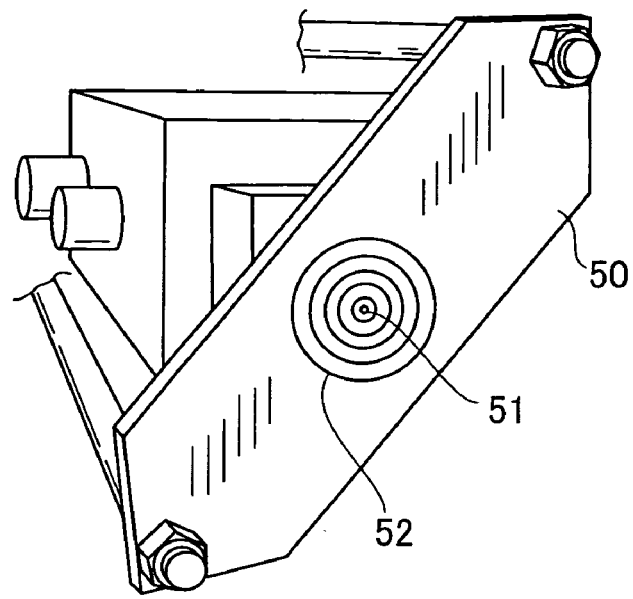
FIG. 4 is a perspective view showing a schematic construction of a target member of the position adjustment device according to the preferred embodiment of the present invention.

Specifically, as illustrated in FIG. 3A, the position adjustment device 100 and the screen member 300 are positioned facing with each other, and the laser light is beamed from the laser transmitter 30 in a three o'clock direction. In this step, the beamed spot P1 of the laser light on the screen member 300 should be marked (using a scriber, for example).

The position adjustment device 100 in this stage is fixed to the correction stay 200 in such a constructional combination that the position reference bolt 15 is inserted in the position reference hole 231, the fixing projection 222 in the fixing hole 11, the fixing projection 221 in the fixing hole 12, the fixing projection 226 in the fixing hole 13, and the fixing projection 225 is inserted in the fixing hole 14. The correction stay 200 should be fixed to a worktable with a vise and the like so that its reference face (face of the fixing portion 200, for example) confronts the screen member 300 in a face-to-face manner.

Figure 3D:
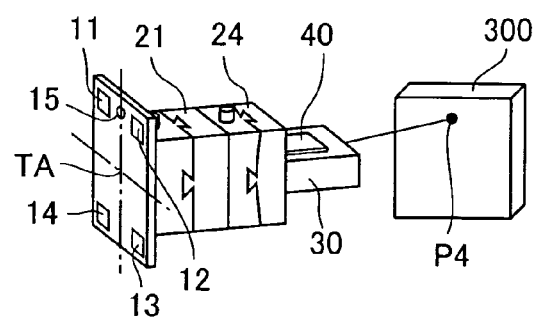
Figure 3B:
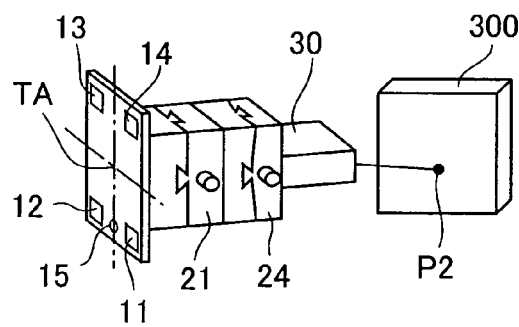

Then, as illustrated in FIG. 3B, the position adjustment device 100 is rotated about the rotary axis TA, and the laser light is beamed from the laser transmitter 30 in a six o'clock direction. In this step, the beamed spot P2 of the laser light on the screen member 300 should be marked (using a scriber, for example). The position adjustment device 100 in this stage is fixed to the correction stay 200 in such a constructional combination that the position reference bolt 15 is inserted in the position reference hole 234, the fixing projection 228 is inserted in the fixing hole 11, the fixing projection 227 in the fixing hole 12, the fixing projection 224 in the fixing hole 13, and the fixing projection 223 is inserted in the fixing hole 14.

Figure 3E:
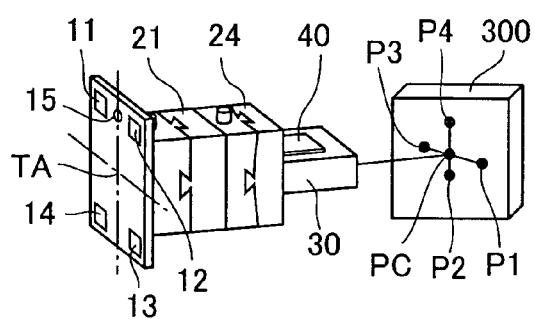
Figure 3C:
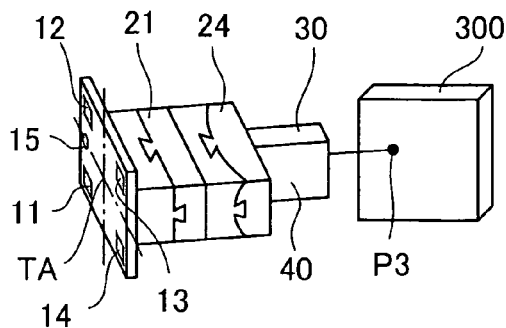

Then, as illustrated in FIG. 3C, the position adjustment device 100 is rotated about the rotary axis TA, and the laser light is beamed from the laser transmitter 30 in a nine o'clock direction. In this step, the beamed spot P3 of the laser light on the screen member 300 should be marked (using a scriber, for example). The position adjustment device 100 in this stage is fixed to the correcting stay 200 is such a constructional combination that the position reference bolt 15 is inserted in the position reference hole 233, the fixing projection 226 is inserted in the fixing hole 11, the fixing projection 225 in the fixing hole 12, the fixing projection 222 in the fixing hole 13, and the fixing projection 221 is inserted in the fixing hole 14.

Then, as illustrated in FIG. 3D, the position adjustment device 100 is rotated about the rotary axis TA, and the laser light is beamed from the laser transmitter 30 in a twelve o'clock direction. In this step, the beamed spot P4 of the laser light on the screen member 300 should also be marked (using a scriber, for example). The position adjustment device 100 in this stage is fixed to the correcting stay 200 is such a constructional combination that the position reference bolt 15 is inserted in the position reference hole 232, the fixing projection 224 is inserted in the fixing hole 11, the fixing projection 223 in the fixing hole 12, the fixing projection 228 in the fixing hole 13, and the fixing projection 227 is inserted in the fixing hole 14.

As illustrated in FIG. 3E, after marking the four spots P1-P4, the position adjustment of the laser transmitter 30 (beamed direction of the laser light) is performed so that the laser light beamed from the laser transmitter 30 hits the center of the four marks. This adjustment is carried out by the X-Y stage 21 and/or the angle adjusting stage 24. This step completes the position adjustment (correction) of the laser transmitter 30 included in the position adjustment device 100.

Temporarily fixing the laser transmitter 30 at the three or more points at regular intervals about the rotary axis TA allows the beamed points (three or more points) to be spotted on a circle circumference. The circle circumference is drawn with a center point precisely defined by the projection of the laser beam onto the screen member 300. The rotary axis TA is defined by the straight line that passes through the light emitting opening 31 and is substantially perpendicular to the screen member 300 having a surface that is substantially perpendicular to the ground surface.

That is, the three or more points are located on the circle circumference drawn about the beamed point of the laser light that is perpendicularly beamed to a reference plane. The reference plane is perpendicular to the ground surface on which the position adjustment device 100 is placed.

Accordingly, a variation of the laser transmitter 30 can be corrected by adjusting the direction of the laser light beamed from the laser transmitter 30 so as to make the laser light hit the center of the beamed spots (three or more points) on the screen member 300.

For confirmation, the spots of twelve to nine o'clock directions can be marked again, and an amount of variation can be measured. An angle variation θ° of the laser transmitter 30 after plus-minus (±) correction is defined by the following formula:

$$\text{arcTAN(amount of variation in the markings (mm))/} \\ \text{distance between the position adjustment device} \\ \text{100 and the screen member 300 (mm))} \times \tfrac{1}{2}$$

Further, the directions of the beamed laser light are not restricted to four ways, which are three, six, nine and twelve o'clock directions, though such directions have been introduced in the embodiment. That is, beaming the laser light to three or more points from the laser transmitter 30 at regular intervals in the rotary direction can carry out the object of the present invention; wherein the laser transmitter 30 is adapted to rotate about the rotary axis TA that passes through the light emitting opening 31 of the laser transmitter 30 and is perpendicular to the screen member 300.

Further, the position adjustment device 100 is prepared to beam the laser light that is determined to be a base for adjusting the position of the reflector 410. As will be described thereafter, the position of the reflector 410 is adjusted based on the laser light beamed from the position adjustment device 100 and reflected from the reflector 410 (mirror 540). As shown in FIG. 4, the laser transmitter 30 can be provided with a target member 50 at its front face (in the direction the laser light beams). The target member 50 comprises a laser-light-transmission hole 51 through which the laser light beamed from the light emitting opening 31 passes. The laser light reflected from the reflector 410 (mirror 540) hits the target member 50. The target member 50 is adapted to be a guide in adjusting the position of the reflector 410. The target member 50 is composed of a plurality of circles drawn about the laser-light-transmission hole 51.

With reference to FIGS. 5 to 8, the reflector 410 whose position is to be adjusted using the above position adjustment device 100 will be described.

Figure 5:
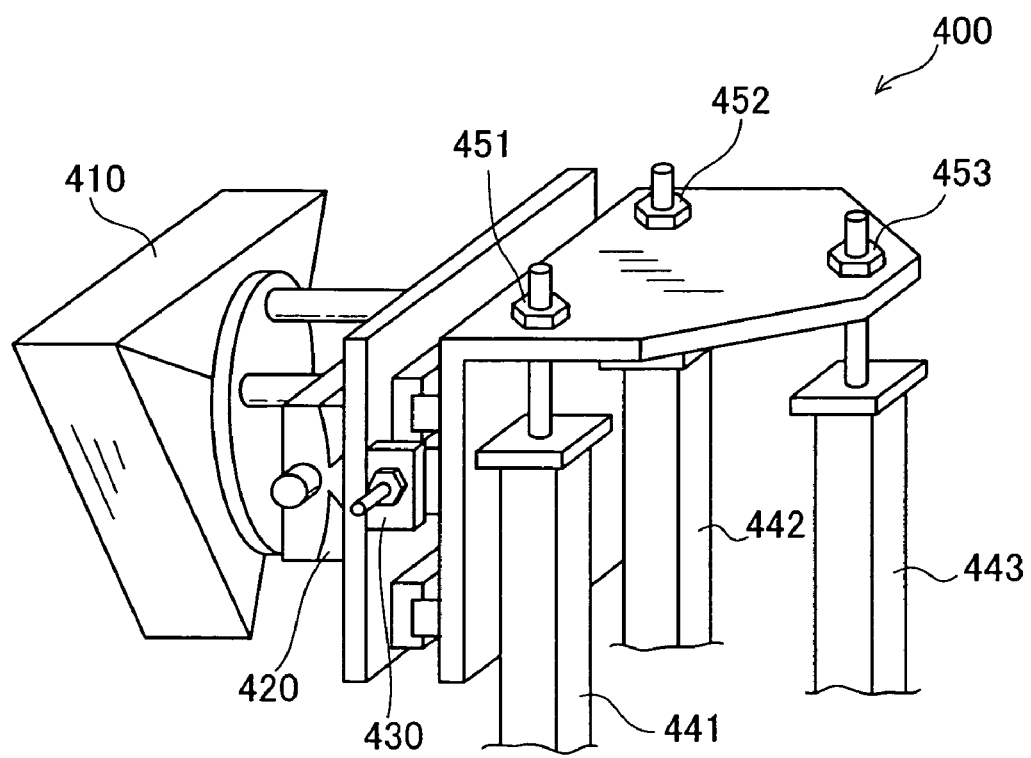
FIG. 5 is a perspective view showing a schematic construction of a reflector device according to the preferred embodiment of the present invention.
Figure 6:
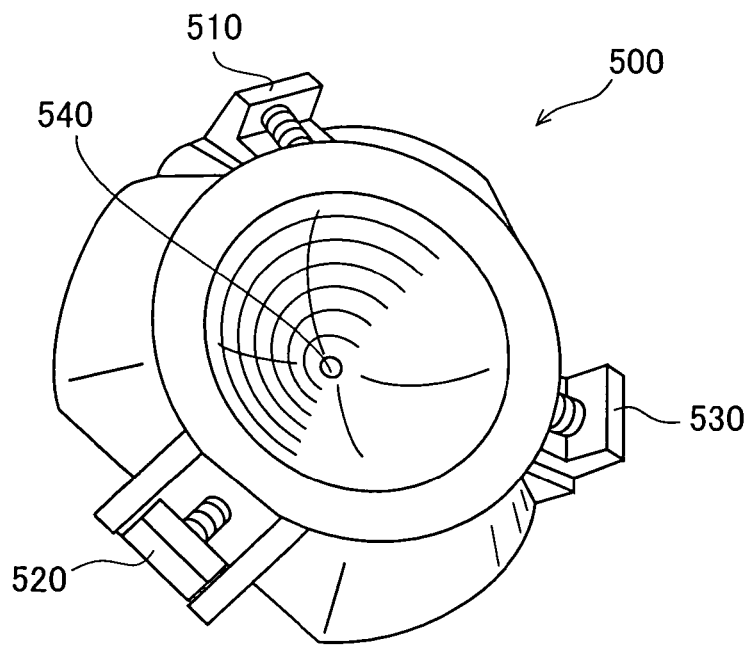
FIG. 6 is a perspective view showing a schematic construction of a mirror jig according to the preferred embodiment of the present invention.
Figure 7:
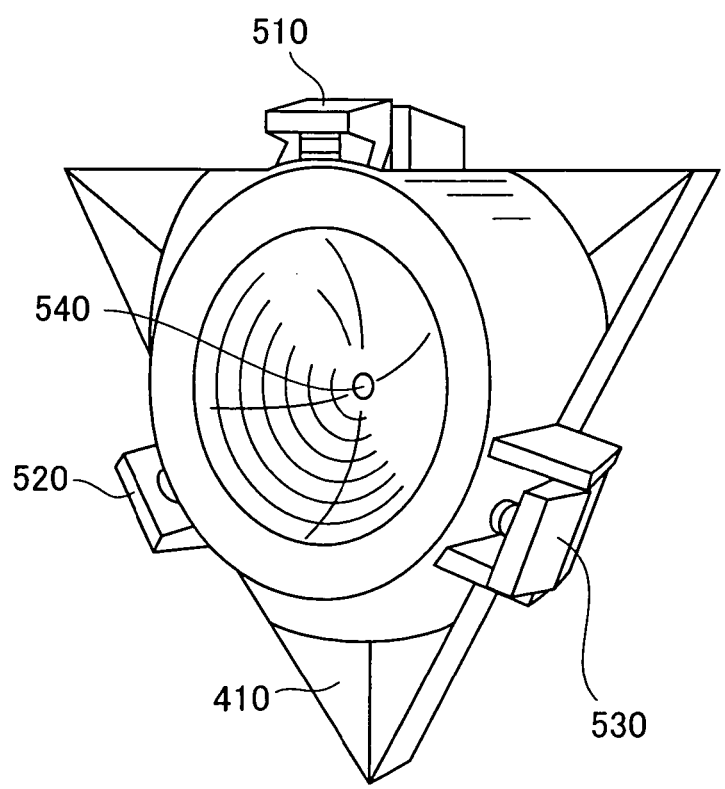
FIG. 7 is a perspective view showing a schematic construction where the mirror jig is mounted to a reflector according to the preferred embodiment of the present invention.
Figure 8:
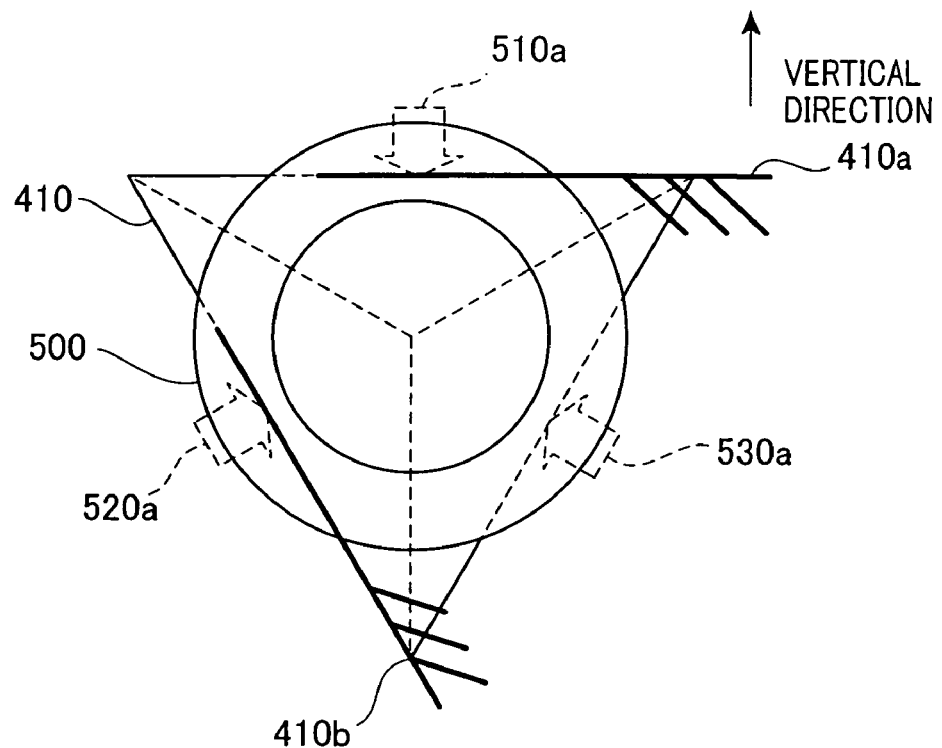
FIG. 8 is an explanatory plane view showing a positioning of the mirror jig and the reflector according to the preferred embodiment of the present invention.

FIG. 5 is a perspective view showing a schematic construction of a reflector device 400 according to the preferred embodiment of the present invention. FIG. 6 is a perspective view showing a schematic construction of a mirror jig 500 according to the preferred embodiment of the present invention. FIG. 7 is a perspective view showing a schematic construction where the mirror jig 500 is mounted to a reflector according to the preferred embodiment of the present invention. FIG. 8 is an explanatory plane view showing a positioning of the mirror jig 500 and the reflector 410 according to the preferred embodiment of the present invention.

The reflector device 400 is designed to reflect radio waves beamed from a radar device W. The reflector device 400 comprises a reflector 410 having, for example, three reflection surfaces that form a concaved pyramid, and an angle adjustment stage 420 used for adjusting the angle of the reflector 410. The reflector device 400 also comprises legs 441, 442 and 443 that support a left-and-right adjustment bolt 430 used for adjusting the position of (the adjustment stage of) the reflector 410 in the left-and-right direction. The legs 441-443 also support the reflector 410, the angle adjustment stage 420, the left-and-right adjustment bolt 430, and others. The reflector device 400 further comprises up-and-down adjustment bolts 451, 452 and 453 that are designed to adjust the position of the reflector 410 in the up-and-down direction.

The position adjustment of the reflector 410 is performed according to a position where reflected laser light hits. The laser light is beamed from the position adjustment device 100, reflects at the reflector 410 and hits the reflector 410. However, some types of the reflectors 410 used in detection of the radar devices are designed to reflect radio waves, and are thus not suited for reflecting the laser light.

Therefore, as shown in FIG. 6, this preferred embodiment introduces a mirror jig 500 that is mounted to the reflector device 400 so as to adjust the position of the reflector 410. As illustrated in FIG. 6, the mirror jig 500 is provided at its center with a mirror 540 (the mirror 540 is set at the center hole), and clump members 510, 520 and 530 that are provided with respect to three edges of the reflector 410.

As shown in FIG. 7, the mirror jig 500 is mounted to the reflector 410 at the side of reflection face with the clamp members 510, 520 and 530. As shown in FIG. 8, for example, the mirror jig 500 can be clumped to the reflector 410 at its prepared clump positions 510a, 520a and 530a, by moving the mirror jig 500 in the lower right direction on the drawing (FIG. 8) with respect to the vertical direction, based on two reference edge surfaces of the reflector 410 (the reference faces 410a, 410b). The mirror jig 500 is designed so that the mirror 540 takes place at the center of the reflector 410 when the mirror jig 500 is mounted to the reflector 410.

Merely making the laser light reflected from the mirror 540 hit the predetermined area allows a simple positioning of the reflector 410.

When the mirror 540 used has a dimension varying from the diameter of the beamed spot of the laser light, such a variation adversely presents deviation in positioning the reflector 410. Therefore, the diameter of the mirror 540 should be designed to have substantially the same size as the spot diameter of the laser light (4 mm to 6 mm, for example).

One example presents the laser transmitter 30 that beams the laser light with a spread angle of 0.0687 degree. Such a spot diameter of the laser light beamed from the laser transmitter 30 that is 5000 mm apart from the laser transmitter 30 becomes: tan 0.0687×5000=5.99. Accordingly, the diameter of the mirror 540 should be 6 mm.

Such an arrangement can be completed by making the dimension of the mirror 540 be substantially equal to the spot diameter, or by making the hole of the mirror jig 500 be substantially equal to the spot diameter, in order to cause the disposed dimension of the mirror 540 to be substantially the same as the spot diameter.

These arrangements preferably restrain the variation in position adjustment of the reflector 410.

Figure 9:
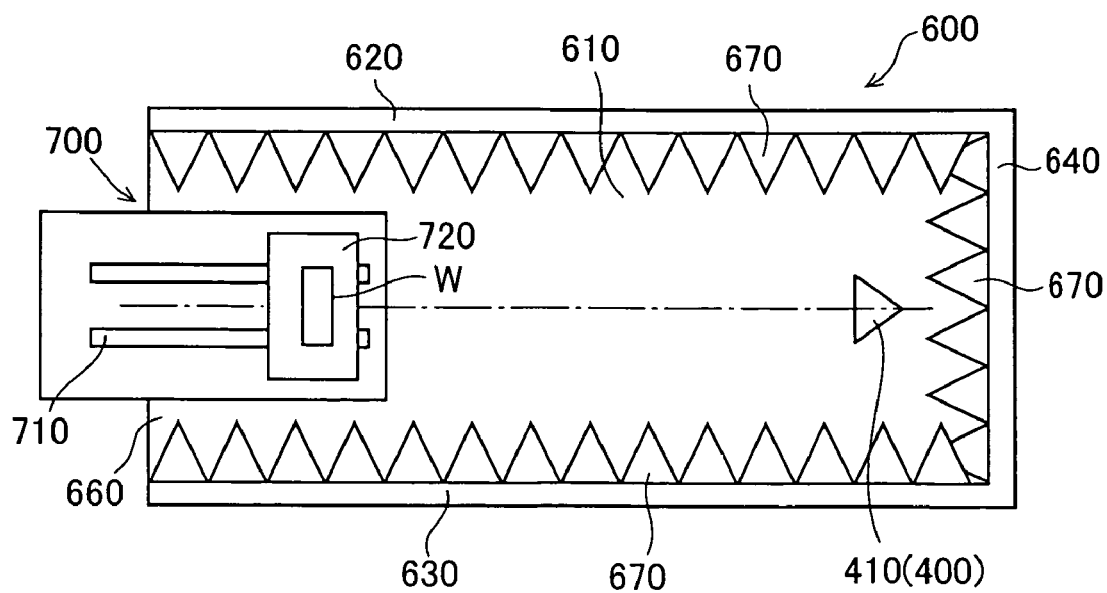
FIG. 9 is a plane sectional view showing a schematic construction of the detection device according to the preferred embodiment of the present invention.
Figure 10:
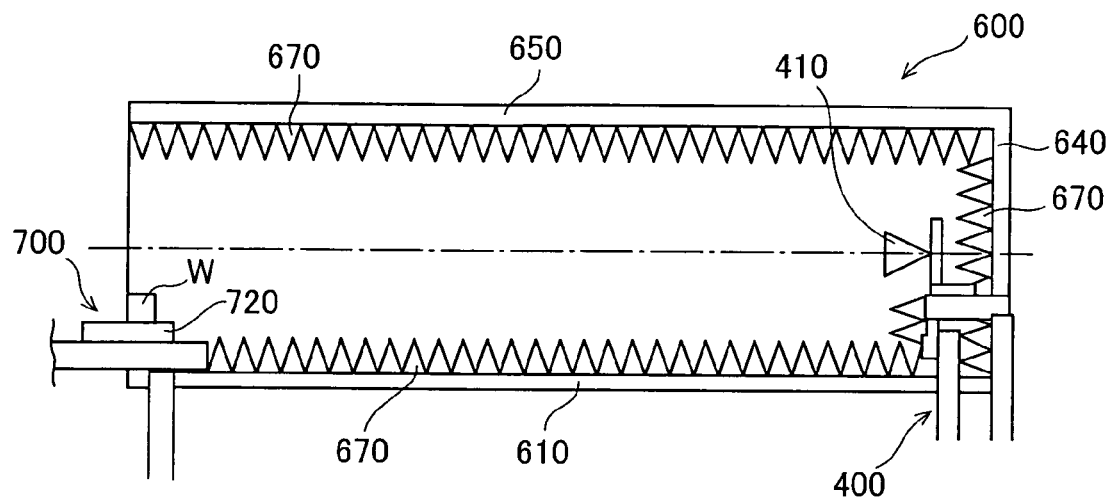
FIG. 10 is a side sectional view showing a schematic construction of the detection device according to the preferred embodiment of the present invention.

With reference to FIGS. 9 to 10, a detection device using the reflector 410 whose position has been adjusted by the position adjustment device 100 will be described.

FIG. 9 is a plane sectional view showing a schematic construction of a wave dark box 600 according to the preferred embodiment of the present invention. FIG. 10 is a side sectional view showing a schematic construction of the wave dark box 600 according to the preferred embodiment of the present invention.

The detection device detects a radar device W using the radar device W fixed to a fixing table 700 and the reflector 410 that reflects radio waves beamed from the radar device W. The detector device is adapted to receive the radio waves reflected from the reflector 410.

The detector device comprises a wave dark box 600, a left-and-right adjustment bolt 430, an angle adjustment stage 420, up-and-down adjustment bolts 451, 452, 453 (reflector position adjustment means), the reflector 410 (reflector device 400) adjusted by the position adjustment device 100, and the fixing device 700 used for fixing the radar device W.

As shown in FIGS. 9 and 10, the detection of the radar device is performed inside the wave dark box 600. The wave dark box 600 has an open face (insertion hole 660) used for inserting the radar device W therethrough, and is provided with a wave absorber 670 on the other faces (bottom face 610, side faces 620, 630, back face 640 and upper face (ceiling) 650).

The reflector device 400 is positioned so as to place the reflector 410 at the side of the back face 640 inside the wave dark box 600. The fixing table 700 adapted to fix the radar device W and the position adjustment device 100 is disposed at the side of the insertion hole 660 inside the wave dark box 600. The reflector 410 is placed inside the wave dark box 600, and the position adjustment of the reflector 410 is performed inside the wave dark box 600.

The fixing table 700 includes a guide 710 and a base 720 that is movably secured to the guide 710. The radar device W and the position adjustment device 100 are fixedly placed on the base 720 with a fixing member (not shown). The radar device W and the position adjustment device 100 fixed to the base 720 are conveyed to a predetermined position. The predetermined position designates a location where the radar device W is to be detected (for example, five meters away from the reflector 410).

A detection method for detecting the radar device W using the detection device will be described.

Initially, a reflector adjustment step for adjusting the position of the reflector 410 is performed. In this step the position adjustment device 100 is fixed to the base 720, and the base 720 is moved along the guide 710 to the position where the radar device W is detected. In this stage, the position adjustment device 100 should be placed so as to face the reflector 410.

Then, laser light is beamed from the laser transmitter 30 of the position adjustment device 100 to the mirror 540 mounted to the reflector 410. The laser light beamed to the mirror 540 reflects and beams back to the side of the laser transmitter 30. The reflected laser light is beamed to the target member 50. The beamed position on the target member 50 where the laser light hits determines a variation of the reflector 410. Then, the position of the reflector 410 is adjusted (alignment is performed) so as to make the laser light hit substantially the center of the target member 52, using the left-and-right adjustment bolt 430, the angle adjustment stage 420, and the up-and-down adjustment bolts 451-453.

After completion of the positioning of the reflector 410, the radar device W is fixed to the base 720, and the base 720 is moved along the guide 710 to a position where the radar device W is detected. In this stage, the radar device W should be placed to face the reflector 410. Then, the radio waves are beamed from the radar device W and reflect at the reflector 410 and are received by the radar device W, by which step the radar device W is detected.

In this detection method, the position adjustment device 100 whose position has been adjusted in advance as described above adjusts the position of the reflector 410. Such an arrangement allows the further highly precise positioning of the reflector 410. That is, such an arrangement provides a centering of the reflector 410.

The reflected laser light (the spot beamed on the target member 52) tends to spread and appear fuzzy, which makes the precise measurement of the dimension of position variation to be difficult. Therefore, the dimension of position variation can be replaced by maximum variation between centers. The maximum variation between centers is defined by the formula of ((the spot diameter beamed on the target member 52)−(the diameter of the laser light transmittance hole 51))/2 (mm).

Then, the dimension of variation of the reflector 410 whose position has been adjusted can be measured. An angle variation θ2° of the reflector 410 is defined by the following formula:

arcTAN(the maximum variation between centers (mm)/(2×(the distance between the position adjustment device 100 and the reflector 410 (mm)))

Modified Example 1

Figure 11:
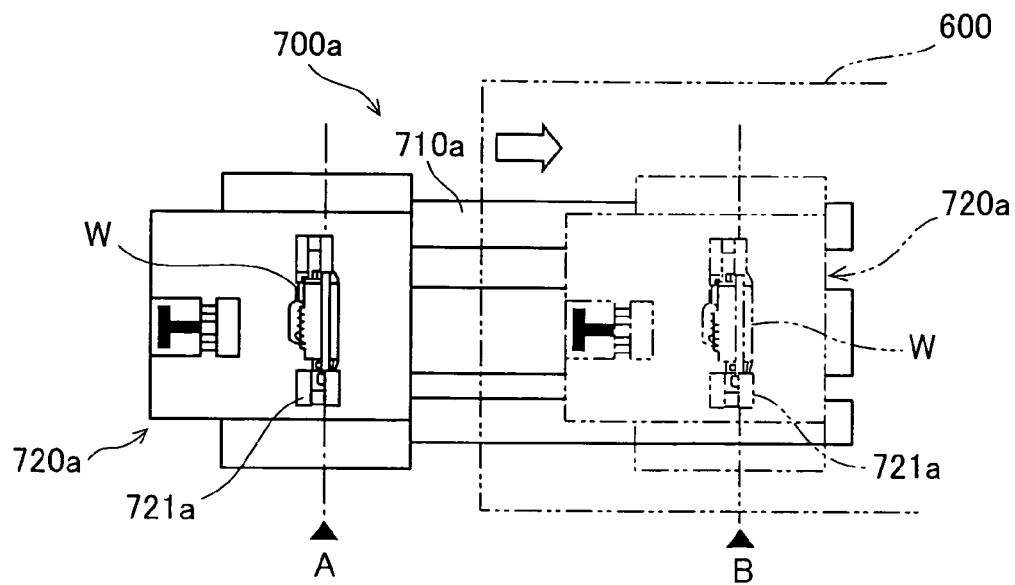
FIG. 11 is a plane view showing a schematic construction of an automatic transportation device according to the modified example 1.
Figure 12:
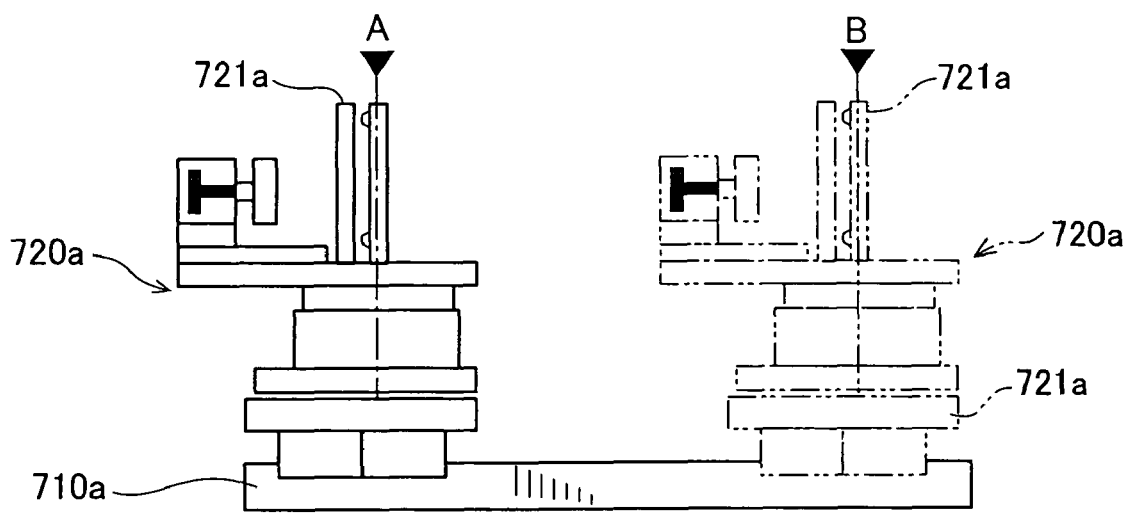
FIG. 12 is a side elevation view showing a schematic construction of the automatic transportation device according to the modified example 1.
Figure 13:
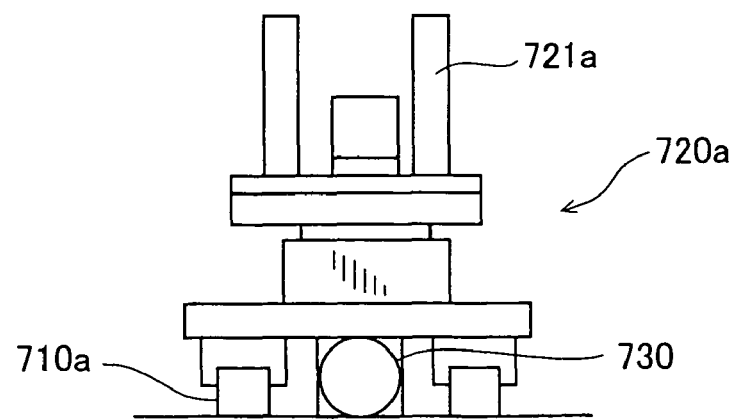
FIG. 13 is a front elevation view showing a schematic construction of the automatic transportation device according to the modified example 1.

As a modified example 1, the placement and removal of the radar device W into/from the wave dark box 600 can be performed automatically. FIG. 11 is a plane view showing a schematic construction of an automatic transportation device according to the modified example 1. FIG. 12 is a side elevation view showing a schematic construction of the automatic transportation device according to the modified example 1. FIG. 13 is a front elevation view showing a schematic construction of the automatic transportation device according to the modified example 1.

As illustrated in FIGS. 11, 12, 13, the modified example 1 provides the automatic transportation device (automatic transportation means) 700a, which comprises a guide 710a, a base 720a, a fixing member 721a and an electric cylinder 730. The guide 710a is disposed between the inside and outside of the radio wave dark box 600 in the vicinity of the insertion hole 660 of the radio wave dark box 600.

The base 720a is movably secured to the guide 710a and is provided with a fixing member 721a on the upper face thereof. The fixing member 721a is adapted to fix the radar device W. The base 720a is driven by the electric cylinder 730 so as to move between the outside and inside of the radio wave dark box 600 along the guide 710a. The electric cylinder 730 can be connected to a control device (personal computer, for example) with wired or wireless control system to operate in accordance with control signals sent from the control device.

A detection of the radar device W using the automatic transportation device 700 will be described.

First, the base 720a is positioned outside the radio wave dark box 600 by operating the electric cylinder 730. If the base 720a is already positioned outside the radio wave dark box 600, the operation of the electric cylinder 730 is not needed.

Then, the radar device W is fixed to the fixing member 721a of the base 720a that is placed outside the radio wave dark box 600. Further, the electric cylinder 730 is operated to transfer the base 720a, to which the radar device W is fixed, to a predetermined position inside the radio wave dark box 600 (the automatic transportation step).

That is, the radar device W fixed to the base 720a is automatically transferred to the inside of the radio wave dark box 600. The base 720a is adapted to stop at a position that is determined by a distance between the radar device W and the reflector 410. The position at which the radar device W stops can be determined by the length of the guide 710a, or by control signals sent from the control device, i.e., driving amount of the electric cylinder 730 (the amount the base 720a is moved).

Following the detection of the radar device W, the electric cylinder 730 is operated to transfer the base 720a, to which the radar device W is fixed, to the outside of the radio wave dark box 600.

Automatically placing and displacing the radar device W into/from the radio wave dark box 600 is preferred because such an arrangement reduces the number of man-hours required to positioning it.

Modified Example 2

Figure 14:
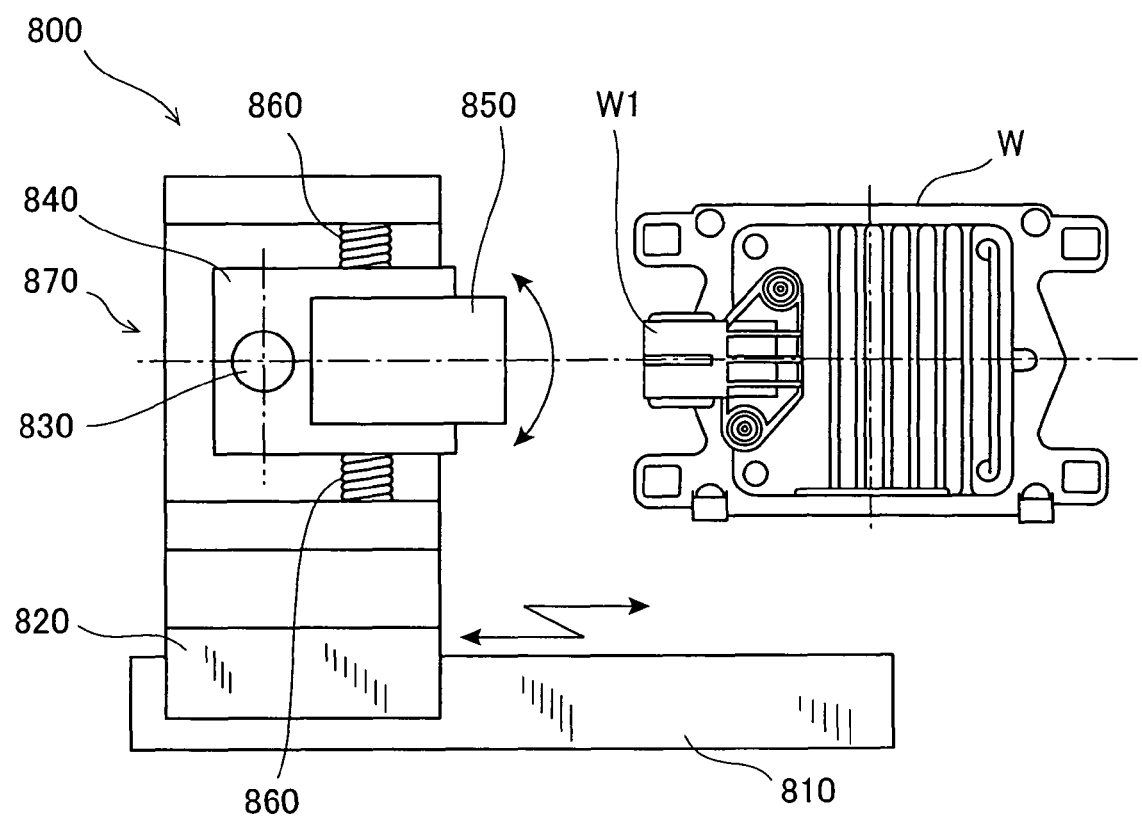
FIG. 14 is a side elevation view showing a schematic construction of an automatic transportation device according to the modified example 2.

A modified example 2 presents a construction that the connection and disconnection of a power connecter to/from to the radar device W is done automatically. FIG. 14 is a side elevation view showing a schematic construction of an automatic transportation device according to the modified example 2.

As shown in FIG. 14, the automatic power connection device (automatic power connection means) 800 comprises a guide 800, an electric cylinder 820, a support pin 830, a connecter holder 840, a connecter 850 and floating springs 860.

The guide 810 is provided to the fixing table 700 in the vicinity of the radar device W that is fixed to the fixing member of the fixing table 700 (the base 720). The guide 810 is placed in such a manner that allows the main body 870 to move parallel to the ground surface to connect and disconnect a connecter W1 of the radar device W to/from a connecter 850. The guide 810 should be provided at least with such a length that allows the above movement of the guide 810.

The main body 870 includes the connecter 850 to be electrically connected to the connecter W1 of the radar device. The main body 870 is mounted to the guide 810 capable of moving by the electric cylinder 820. The main body 870 is adapted to allow the floating springs 860 to float the connecter holder 840 about the support pin 830. The connecter holder 840 is used for holding the connecter 850.

The electric cylinder 820 can be connected to a control device (personal computer, for example) with wired or wireless control system to operate in accordance with control signals sent from the control device.

The connecter W1 of the radar device W can inevitably present angle variations caused by inaccurate assembly. However, the construction introduced in the modified example 2 enables the above floating connecter 850 to absorb such angle variations of the connecter W1 of the radar device W.

A detection of the radar device W using the automatic power connection device 800 will be described.

Before starting the detection of the radar device W, the electric cylinder 820 is operated to move the main body 870 to the radar device W (connecter W1) that is fixed to the fixing member of the fixing table 700 (base 720). The movement of the main body 870 causes the connecter W1 of the radar device W to be connected with the connecter 850 (the automatic power connection step).

After completion of the detection of the radar device W, the electric cylinder 820 is operated to move the main body 870 apart from the radar device W (connecter W1) that is fixed to the fixing member of the fixing table 700 (base 720), in a direction opposite to the initial direction at the beginning of the detection. The movement of the main body 870 causes the connecter W1 of the radar device W to be disconnected from the connecter 850 (the automatic power connection step).

Automatically connecting and disconnecting the radar device W to/from the radio wave dark box 850 is preferred because such an arrangement reduces the number of man-hours required for positioning the radar device W.

What is claimed is:

1. A method for adjusting a position of a reflector, the reflector reflecting radio waves beamed from a radar device, the method comprising:

adjusting a direction of a laser light beamed from a light emitting portion of a position adjustment device such as to be beamed in a direction substantially perpendicular to a face of a screen member, the position adjustment device used for adjusting a position of the reflector, the face of the screen member being placed substantially perpendicular to a ground surface;

fixing the position adjustment device to a fixing table for the radar device, the reflector positioned to face the position adjustment device, the position adjustment device adjusted in the laser light adjusting step;

adjusting a position of the reflector, the position of the reflector being adjusted based on the laser light beamed from the light emitting portion of the position adjustment device fixed to the fixing table; and mounting a mirror to a center of the reflector, the mounting step is performed in the reflector adjusting step, wherein the laser light is beamed to the reflector provided with the mirror, the reflector being adjusted to a position where the laser light reflected from the mirror hits a predetermined area; wherein the laser light adjusting step comprises:

arranging a light emitting opening of the light emitting portion that beams the laser light to face the face of the screen member;

beaming the laser light from the light emitting portion, the light emitting portion rotating about a rotary axis, the rotary axis set in a direction perpendicular to the face of the screen member; and adjusting the direction of the laser light beamed from the light emitting portion to make the laser light hit a center of three or more projected spots on the face of the screen, the laser light which forms the spots being beamed from three or more different positions by rotating the light emitting portion;

the mirror used in the reflector adjusting step has a size substantially equal to a spot diameter of the laser light.

2. A method for adjusting a position of a reflector, the reflector reflecting radio waves beamed from a radar device, the method comprising:

adjusting a direction of a laser light beamed from a light emitting portion of a position adjustment device such as to be beamed in a direction substantially perpendicular to a face of a screen member, the position adjustment device used for adjusting a position of the reflector, the face of the screen member being placed substantially perpendicular to a ground surface;

fixing the position adjustment device to a fixing table for the radar device, the reflector positioned to face the position adjustment device, the position adjustment device adjusted in the laser light adjusting step; and adjusting a position of the reflector, the position of the reflector being adjusted based on the laser light beamed from the light emitting portion of the position adjustment device fixed to the fixing table wherein the laser light adjusting step comprises:

arranging a light emitting opening of the light emitting portion that beams the laser light to face the face of the screen member;

beaming the laser light from the light emitting portion, the light emitting portion rotating about a rotary axis, the rotary axis set in a direction perpendicular to the face of the screen member; and adjusting the direction of the laser light beamed from the light emitting portion to make the laser light hit a center of three or more projected spots on the face of the screen, the laser light which forms the spots being beamed from three or more different positions by rotating the light emitting portion; wherein the reflector and the radar device fixed to the fixing table are placed in a wave dark box having side wall faces covered with a wave absorber, and the method further comprises automatically conveying the radar device fixed to the fixing table to the wave dark box.

3. The method according to claim 2, further comprising mounting a mirror to a center of the reflector, the mounting step is performed in the reflector adjusting step, wherein the laser light is beamed to the reflector provided with the mirror, the reflector being adjusted to a position where the laser light reflected from the mirror hits a predetermined area.

4. A method for adjusting a position of a reflector, the reflector reflecting radio waves beamed from a radar device, the method comprising:

adjusting a direction of a laser light beamed from a light emitting portion of a position adjustment device such as to be beamed in a direction substantially perpendicular to a face of a screen member, the position adjustment device used for adjusting a position of the reflector, the face of the screen member being placed substantially perpendicular to a ground surface;

fixing the position adjustment device to a fixing table for the radar device, the reflector positioned to face the position adjustment device, the position adjustment device adjusted in the laser light adjusting step;

adjusting a position of the reflector, the position of the reflector being adjusted based on the laser light beamed from the light emitting portion of the position adjustment device fixed to the fixing table; and automatically connecting and disconnecting a power connecter to/from the radar device fixed to the fixing table; wherein the laser light adjusting step comprises:

arranging a light emitting opening of the light emitting portion that beams the laser light to face the face of the screen member;

beaming the laser light from the light emitting portion, the light emitting portion rotating about a rotary axis, the rotary axis set in a direction perpendicular to the face of the screen member; and adjusting the direction of the laser light beamed from the light emitting portion to make the laser light hit a center of three or more projected spots on the face of the screen, the laser light which forms the spots being beamed from three or more different positions by rotating the light emitting portion.

5. The method according to claim 4, further comprising mounting a mirror to a center of the reflector, the mounting step is performed in the reflector adjusting step, wherein the laser light is beamed to the reflector provided with the mirror, the reflector being adjusted to a position where the laser light reflected from the mirror hits a predetermined area.

6. A device for adjusting a position of a reflector, the reflector reflecting radio waves beamed from a radar device, the device comprising:

a position adjustment unit having a light emitting portion which beams a laser light; and a reflector-position-adjustment unit used for adjusting a position of the reflector, the reflector-position-adjustment unit using the position adjustment unit; wherein a direction of the laser light beamed by the light emitting portion is adjusted to be beamed in a direction substantially perpendicular to a face of a screen member by arranging a light emitting opening of the light emitting portion to face the screen member, setting a rotary axis in a direction perpendicular to the face of the screen member, beaming the laser light from three or more different positions set by rotating the light emitting portion about the rotary axis, and making the laser light hit a center of three or more projected spots on the face of the screen of the laser light beamed from the three or more different positions; wherein the reflector is provided with a mirror at a center of the reflector, and the reflector-position-adjustment unit is adapted to act so that the reflector is adjusted to a position where the laser light beamed by the light emitting portion and reflected from the mirror hits a predetermined area; and the mirror has a size that is substantially equal to a spot diameter of the laser light.

7. A device for adjusting a position of a reflector, the reflector reflecting radio waves beamed from a radar device, the device comprising:

a position adjustment unit having a light emitting portion which beams a laser light;

a reflector-position-adjustment unit used for adjusting a position of the reflector, the reflector-position-adjustment unit using the position adjustment unit;

a fixing table to which the position adjustment unit and the radar device are fixed, the radar device fixed to the fixing table and the reflector are placed in a wave dark box having side wall faces covered with a wave absorber; and an automatic transportation unit for automatically conveying the radar device fixed to the fixing table to the wave dark box; wherein a direction of the laser light beamed by the light emitting portion is adjusted to be beamed in a direction substantially perpendicular to a face of a screen member by arranging a light emitting opening of the light emitting portion to face the screen member, setting a rotary axis in a direction perpendicular to the face of the screen member, beaming the laser light from three or more different positions set by rotating the light emitting portion about the rotary axis, and making the laser light hit a center of three or more projected spots on the face of the screen of the laser light beamed from the three or more different positions.

8. The device according to claim 7, wherein the reflector is provided with a mirror at a center of the reflector, and the reflector-position-adjustment unit is adapted to act so that the reflector is adjusted to a position where the laser light beamed by the light emitting portion and reflected from the mirror hits a predetermined area.

9. A device for adjusting a position of a reflector, the reflector reflecting radio waves beamed from a radar device, the device comprising:

a position adjustment unit having a light emitting portion which beams a laser light;

a reflector-position-adjustment unit used for adjusting a position of the reflector, the reflector-position-adjustment unit using the position adjustment unit;

a fixing table to which the position adjustment unit and the radar device are fixed; and an automatic power connection unit for automatically connecting and disconnecting a power connecter to/from the radar device fixed to the fixing table; wherein a direction of the laser light beamed by the light emitting portion is adjusted to be beamed in a direction substantially perpendicular to a face of a screen member by arranging a light emitting opening of the light emitting portion to face the screen member, setting a rotary axis in a direction perpendicular to the face of the screen member, beaming the laser light from three or more different positions set by rotating the light emitting portion about the rotary axis, and making the laser light hit a center of three or more projected spots on the face of the screen of the laser light beamed from the three or more different positions.

10. The device according to claim 9, wherein the reflector is provided with a mirror at a center of the reflector, and the reflector-position-adjustment unit is adapted to act so that the reflector is adjusted to a position where the laser light beamed by the light emitting portion and reflected from the mirror hits a predetermined area.

* * * * *